United States Patent [19]

Shio et al.

[11] Patent Number: 5,711,798
[45] Date of Patent: Jan. 27, 1998

[54] PIGMENT CONTAINING LOW-ORDER TITANIUM OXIDE AND METHOD OF MANUFACTURING THE SAME

[75] Inventors: Shoichiro Shio; Fukuji Suzuki, both of Yokohama, Japan

[73] Assignee: Shiseido Co., Ltd., Tokyo, Japan

[21] Appl. No.: 541,867

[22] Filed: Oct. 10, 1995

[30] Foreign Application Priority Data

Oct. 11, 1994 [JP] Japan .................................. 6-271679

[51] Int. Cl.⁶ .................................................. C04B 14/20
[52] U.S. Cl. .......................... 106/417; 106/418; 106/419; 106/426; 106/429; 106/436; 106/442; 106/446
[58] Field of Search ...................... 106/417, 418, 106/426, 442, 446, 429, 436, 419

[56] References Cited

U.S. PATENT DOCUMENTS

| | | | |
|---|---|---|---|
| 3,087,828 | 4/1963 | Linton | 106/417 |
| 3,515,566 | 6/1970 | Moody et al. | 106/442 |
| 3,640,743 | 2/1972 | Sheehan | 106/442 |
| 3,640,744 | 2/1972 | Dietz et al. | 106/442 |
| 3,658,566 | 4/1972 | Sheehan et al. | 106/446 |
| 3,822,141 | 7/1974 | Kaufman | 106/418 |
| 4,494,993 | 1/1985 | Bernhard et al. | 106/417 |
| 4,537,636 | 8/1985 | Bernhard et al. | 106/417 |
| 4,552,593 | 11/1985 | Ostertag | 106/417 |
| 4,623,396 | 11/1986 | Kimura et al. | 106/417 |
| 4,948,631 | 8/1990 | Ostertag et al. | 106/417 |
| 5,002,608 | 3/1991 | Fujiwara et al. | 106/437 |
| 5,041,162 | 8/1991 | Brand | 106/446 |
| 5,456,749 | 10/1995 | Iwasa et al. | 106/426 |
| 5,468,289 | 11/1995 | Herget et al. | 106/415 |

FOREIGN PATENT DOCUMENTS

| | | | |
|---|---|---|---|
| 0332071 A1 | 9/1989 | European Pat. Off. | C09C 1/00 |
| 0338428 A1 | 10/1989 | European Pat. Off. | C09C 1/00 |
| 0481460 A3 | 4/1992 | European Pat. Off. | H01B 1/08 |
| 0601761 A1 | 6/1994 | European Pat. Off. | C09C 1/00 |
| 59-126468 | 7/1984 | Japan . | |
| 6-211521 | 8/1994 | Japan . | |
| WO 93/19131 | 9/1993 | WIPO | C09C 1/00 |

OTHER PUBLICATIONS

Shiseido Abstract JP-A-01 158 077 Jun. 21, 1989.

Ishihara Sangyo Kaisha Abstract JP-A-61 106414 Sep. 30, 1986.

Ishihara Sangyo Kaisha Abstract JP-A-07 089721 Apr. 4, 1995.

Ishihara Sangyo Kaisha Abstract JP-A-60 245 671 Dec. 5, 1985.

Shiseido Abstract JP-A-60 245671 May 6, 1986.

Shiseido Abstract JP-A-05 043417 Feb. 23, 1993.

Mitsubishi Metal Abstract JP-A-58 164 653 Sep. 29, 1983.

*Primary Examiner*—Mark L. Bell
*Assistant Examiner*—Louis M. Troilo
*Attorney, Agent, or Firm*—Ronald R. Snider

[57] ABSTRACT

A pigment containing low-order titanium oxide of this invention is characterized in that both aluminum oxide and silicon oxide exist together with low-order titanium oxide. A method of manufacturing such a pigment comprises the steps of; presenting an aluminum compound and silicon as a reducing agents together with titanium dioxide: and then heating and reducing the mixture in an atmosphere having a low oxygen content. According to this method, the pigment containing low-order titanium oxide can efficiently be manufactured, while preventing sintering generated due to the fusion between the reducing agents or the reducing agents and powders.

27 Claims, No Drawings

PIGMENT CONTAINING LOW-ORDER TITANIUM OXIDE AND METHOD OF MANUFACTURING THE SAME

FIELD OF THE INVENTION

The present invention relates to a pigment containing a low-order titanium oxide and a method of manufacturing the same. In particular, the present invention relates to an improvement in a reducing agent and a reducing condition used for manufacturing of the pigment.

BACKGROUND OF THE INVENTION

Various titanium pigments, such as titanium mica pigments in particular, have conventionally been used. As described in the Cosmetics Material Standard, popular titanium mica pigments, among others, have a layer of titanium dioxide formed on a fine flake of mica and exhibit iridescence and various interference colors. As can be seen from Japanese Patent Publication No. 43-25644, a typical method of manufacturing a titanium mica comprises the steps of hydrolyzing an aqueous solution of an inorganic salt of titanium (e.g. titanyl sulfate) in the presence of mica, depositing hydrated titanium dioxide on the surface of mica, and then hydrolyzing thus deposited hydrated titanium dioxide. Thus formed titanium mica pigment exhibits various interference colors depending on the thickness of the titanium dioxide layer formed on the surface of mica particles.

Though various interference colors can be obtained, the color of appearance of the titanium mica pigment is nearly white.

Accordingly, some methods have conventionally been suggested to render various colors to the appearance of the titanium mica pigment. In the most popular method, a coloring pigment such as iron oxide, ultramarine blue, chromium oxide, carbon black, or carmine is added to the formed titanium mica pigment. However, the safety, stability, light resistance, acid resistance, alkali resistance, solvent resistance, heat resistance, and the like of thus colored titanium mica pigment is largely influenced by the nature of the added coloring pigment. For example, a blue titanium mica pigment to which ultramarine blue has been added will lose its color in an alkali solution, while a red titanium mica pigment to which carmine has been added will be deteriorated by light and thus its color will fade. Also, there are not a few ingredients whose safety is questionable, such as the carcinogenicity of 3,4-benzpyrene which may mingle with carbon black and the oral toxicity of hexavalent chromium which may mingle with chromium oxide. Further, as the coloring pigment has been added thereto, the titanium mica pigment may disadvantageously exhibit a color separation in a solvent.

Accordingly, the inventors of the present invention have proposed a color titanium mica pigment of which the interference color can be viewed as the appearance color of the pigment. This pigment was produced by reducing at least a part of the titanium dioxide layer in mica coated with titanium dioxide so as to adjust the amount of the reflected light on the titanium oxide layer surface and that on the mica surface, as described in Japanese Patent Publication No. 4-61032 and No. 4-61033.

In accordance with this color titanium pigment, various appearance colors can be obtained essentially by white mica, white titanium dioxide, and dark-color low-order titanium oxide alone. Namely, a color titanium mica pigment can be obtained with a tone of color, which is as vivid as or more vivid than that of the conventional titanium mica pigment or coloring-pigment added titanium mica pigment, as well as excellent iridescence, stability, safety, light resistance, acid resistance, alkali resistance, solvent resistance, and heat resistance.

When low-order titanium oxide is used as in the case with the above-mentioned color titanium mica pigment, a reducing gas such as hydrogen gas or ammonia gas or metal titanium has to be used to reduce at least a part of titanium dioxide on the titanium mica surface to such low-order titanium oxide.

However, when a gas is used to manufacture such a pigment containing low-order titanium oxide, the reaction apparatus used therefor has to be larger in size due to its inefficiency in reduction. Further, in order to obtain a sufficient degree of reduction, a large amount of the reducing gas is necessary.

When metal titanium is used, on the other hand, there has been a problem that sintering may occur due to the fusion between titanium materials or between titanium and mica.

Recently, it have been reported that silicon is used as a reducing agent for manufacturing the pigment containing low-order titanium oxide in Japanese Patent Publication No.6-211521 and International Patent Publication No.W093/19131.

JP-6-211521 discloses that when silicon used as a reducing agent, the reduction apparatus is smaller in size than that of gas reduction method and that an uniform quality of the pigment can be obtained. However, when the reducing agent is silicon only, a sufficient degree of reduction can not be obtained because there is a limit of the reducing power of silicon.

Though, it is disclosed that one or more types of metal is used as a reducing agent and a halogenated compound is used as a reducing assistant in W093/19131, it is not disclosed that the cooperative effect is caused when both silicon and another metal are used as reducing agents.

In view of the above-mentioned problem of the prior art, the object of the present invention is to provide a uniform pigment containing low-order titanium oxide and an efficient method of manufacturing the same.

SUMMARY OF THE INVENTION

As a result of studies to attain the above-mentioned object, the inventors have found that the pigment containing low-order titanium oxide can be obtained effectively as well as uniformly when both a silicon compound and an aluminum compound are used as reducing agents, Also, it has been found that when a reducing assistant agent is used with said reducing agents, the pigment containing low-order titanium oxide can be obtained with better tone of color. Thus, the present invention has been accomplished.

Namely, the pigment containing low-order titanium oxide in accordance with the present invention is characterized in that both silicon oxide and aluminum oxide exist together with low-order titanium oxide.

In the pigment in accordance with the present invention, the amount of silicon oxide is preferably 0.1–75 wt % with respect to amount of titanium oxide in the material, the amount of aluminum oxide is preferably 0.01–35 wt % with respect to amount of titanium oxide in the material, and the mount of aluminum in the aluminum oxide is preferably two thirds or less as weighty as the amount of silicon in the silicon oxide. More preferably, the mount of silicon oxide is 1.0–45 wt % and the amount of aluminum oxide is 0.01–10 wt %. Term "titanium oxide" used in this application is a concept encompassing both titanium dioxide and low-order titanium oxide.

In one aspect, the pigment containing low-order titanium oxide in the prevent invention is preferably a color titanium mica pigment, in which mica is coated with low-order titanium oxide layer containing titanium oxide, silicon oxide, and aluminum oxide and said titanium oxide is composed of low-order titanium oxide or low-order titanium oxide and titanium dioxide. Further, said low-order titanium oxide layer is preferably coated with titanium dioxide.

The pigment containing low-order titanium oxide in accordance with the present invention is characterized in that an oxide of a metal other than titanium, silicon, and aluminum exists together with low-order titanium oxide, silicon oxide, and aluminum oxide.

The metal oxide other than titanium, silicon and aluminum is preferably one or more selected from the group consisting of manganese, iron, cobalt, nickel, and zinc.

The method of manufacturing the pigment containing low-order titanium oxide of this invention is characterized in comprising the steps of; presenting both an silicon compound and an aluminum compound as reducing agents together with titanium dioxide: and heating and reducing the mixture in an atmosphere having a low oxygen content.

Preferably, the mount of silicon in the silicon compound used as a reducing agent is preferably 0.05–35 wt % with respect to titanium dioxide and the amount of aluminum in the aluminum compound used as the reducing agent is 0.01–17 wt % with respect to titanium dioxide and the amount of aluminum in the aluminum oxide is preferably two thirds or less as weighty as the amount of silicon in the silicon oxide. More preferably, the amount of silicon in the silicon compound is 0.5–20 wt % and the amount of aluminum in the aluminum compound is 0.01–5 wt %.

Also, the reduction temperature is preferably 500°–950° C., and the reduction time is preferably 5 hours or more.

In one aspect, the method of the present invention is characterized in that a color titanium mica pigment, in which mica is coated with low-order titanium oxide layer containing titanium oxide, silicon oxide, and aluminum oxide and said titanium oxide is composed of low-order titanium oxide or both low-order titanium oxide and titanium dioxide, is obtained as the pigment containing low-order titanium oxide.

Such a method preferably comprises the steps that; mica coated with titanium dioxide, in which a surface of mica is coated with titanium dioxide, is presented together with silicon and aluminum as reducing agents: the mixture of the mica coated with titanium dioxide and the reducing agents is heated and reducing in an atmosphere having a low oxygen content at a reduction temperature of 500°–950° C. for 5 hours or more.

In one aspect, the method of the present invention is characterized in that a color titanium mica pigment, in which mica is coated with low-order titanium oxide layer containing titanium oxide, silicon oxide, and aluminum oxide and said titanium oxide is composed of low-order titanium oxide or both low-order titanium oxide and titanium dioxide while said low-order titanium oxide layer is further coated with titanium dioxide, is obtained as the pigment containing low-order titanium oxide.

Such a method preferably comprises the next steps that; mica coated with titanium dioxide, in which a surface of mica is coated with titanium dioxide, is presented together with silicon and aluminum as reducing agents: the mixture of the mica coated with titanium dioxide and the reducing agents is heated and reduced in an atmosphere having a low oxygen content at a reduction temperature of 500°–950° C. for 5 hours or more: and then the reduced product is heated and oxidized in an oxidative atmosphere at a oxidation temperature of 300°–700° C.

In the method of the present invention, a metal other than titanium, silicon and aluminum is preferably used as a reducing agent together with silicon and aluminum. The metal is preferably at least one member selected from the group consisting of metal manganese, metal iron, metal cobalt, metal nickel, metal zinc.

In the method of the present invention, a reducing assistant is preferably used together with the reducing agents. The reducing assistant is preferably an inorganic ammonium compound. The inorganic ammonium compound is preferably at least one member selected from the group consisting of urea, ammonium chloride, ammonium hydrogencarbonate, and ammonium carbonate. Also, the reducing assistant is preferably an organic NH-containing compound. The organic NH-containing compound is preferably at least one member selected from the group consisting of amide, amine, imide and imine.

In the method of the present invention, the atmosphere having a low oxygen content is preferably a reduced-pressure air atmosphere of 100 torr or less, and more preferably of 1 torr or less.

In the following, the present invention will further be explained in detail.

The silicon compound typically used as a reducing agent in the present invention is preferably silicon. Though there is no particular restriction on its particle size and purity, the reducing efficiency increases as the particle becomes finer and as the purity becomes higher.

As to the quantitative relationship between silicon and titanium dioxide, the amount of silicon used as a reducing agent is preferably 0.05–35 wt % with respect to 100 wt % of titanium dioxide, and more preferably 0.5–20 wt %. The reduction may become insufficient when the mount of silicon is less than 0.05 wt %.

When silicon is used as the reducing agent, a small amount of silicon can result in an uniform quality and vivid tone of color since its reducing power is relatively high. However, there is a limit of a degree of reduction when only silicon is used. When the amount of silicon used as a reducing agent is more than 35 wt %, the reduction can hardly progress according to an increase of the amount of silicon. Also, too much amount of silicon used as a reducing agent is not preferably because the amount of silicon oxide generated in the obtained pigment increases and the color tone of the obtained pigment tends to get blurred.

In the present invention, it is characterized that an aluminum compound is used as a reducing agent together with a silicon compound so that higher degree of reduction is obtained by shorter reduction time as compared to the case that only silicon is used as a reducing agent.

The aluminum compound typically used as a reducing agent in the present invention is aluminum hydride ($AlH_3$), lithium aluminum hydride ($LiAlH_4$), or metal aluminum. Most preferably, the aluminum compound is metal aluminum. Though there is no particular restriction on its particle size and purity, the reducing efficiency increases as the particle becomes finer and as the purity becomes higher.

As to the quantitative relationship between metal aluminum and titanium dioxide, the amount of aluminum used as the reducing agent is 0.01–17 wt % with respect to 100 wt % of titanium dioxide, more preferably 0.01–5 wt %.

The sufficient effective by using aluminum with silicon may not be obtained when the amount of aluminum used as a reducing agent is less than 0.01 wt %, while sintering is likely to occur when the amount is more than 17 wt %.

Metal aluminum has strong reducing power but causes sintering and particles easily resulting from the fusion between the reducing agent and the material or between the reducing agents. Accordingly, though a small amount of metal aluminum only can result in vivid tone of color, sintering occurs when only aluminum is used as a reducing agent and its amount is increased to obtain sufficient degree of reduction.

In the present invention, sintering by aluminum is hard to occur by using silicon together with aluminum. Further, insufficient reducing power by only silicon is upper by using aluminum together with silicon. As to the quantitative relationship between metal aluminum and silicon in order that the cooperative effect can exhibit, the amount of aluminum used as a reducing agent is preferably two thirds or less as weighty as the amount of silicon as a reducing agent.

In the present invention, when a metal other than titanium, silicon and aluminum is used as a reducing agent together with silicon compound and aluminum compound, the more excellent color tone can be obtained. The metal is preferably at least one member selected from the group consisting of metal manganese, metal iron, metal cobalt, metal nickel, metal zinc.

When a color titanium mica pigment is to be made as a low-order titanium oxide pigment in the present invention, starting titanium mica material may be of any kind such as a commercially-available product, one made from mica, or one made when a surface of titanium mica is treated with alumina, silica, or the like. Titanium mica herein is mica of which the surface is coated by titanium dioxide. Though there is no restriction on its particle size, while that of commercial titanium mica products is in the order of 1–500 μm, those with a smaller particle size and a particle shape as flat as possible are preferable in that they are more likely to obtain the color titanium mica pigment of the present invention with more beautiful tone of color and iridescence.

While muscovite mica is generally used as mica in the present invention, biotite or the like may be used in some cases.

A reducing assistant is preferably used together with the above-mentioned reducing agent in the present invention.

As the reducing agent, those which are able to perform reduction in cooperation with the reducing agent can be used. For example, the following members can be used:

inorganic ammonia compounds such as urea, ammonium chloride, ammonium hydrogencarbonate, and ammonium carbonate; and organic NH-containing compounds such as amine, amide, imine, and imide.

The above-mentioned amine includes amines such as p-phenylenediamine, 4,4-diaminoazobenzene, monoethanolamine, pyridine, p-nitroaniline, and the like and includes hydroxylamine such as N-phenylhydroxylamine ($C_6H_6$—NH—OH), N,N-dimethylhydroxylamine [$(CH_3)_2$NOH], and the like.

The above-mentioned amide includes oxamide and the like.

The above-mentioned imine includes 1-propanimine ($CH_3CH_2CH$=NH), N-benzylidenemethylamine ($C_6H_5$—CH=N—$CH_3$), aminoguanidine, and the like.

The above-mentioned imide includes 1,2-cyclohexane dicarboximide, succinimide, and the like.

These inorganic and organic reducing assistants may be used separately as well as in combination.

As to the quantitative relationship between the reducing assistant and the reducing agents, at least 0.05 parts by weight of the reducing assistant is preferably used with respect to 10 parts by weight of the reducing agents. More preferably, at least 0.1 parts by weight of the reducing agent is used. Though the effect as the reducing assistant is expected even when its amount is less than 0.05 parts, its definite effect becomes apparent when its mount is 0.05 parts or more.

Thanks to the effect of these reducing assistants, the reduction is performed more thoroughly and vivid tone of color is more easily exhibited.

The reduction temperature in the present invention is applicably within the range of 500°–950° C. and more preferably within the range of 700°–950° C. The reduction may not be performed sufficiently when the reduction temperature is lower than 500° C., while mica itself may be sintered and sintering generated from the fusion between the reducing agents or the reduding agents and the material easily occurs when the temperature exceeds 1000° C.

Also, when heating and oxidizing are performed in the present invention, the oxidation temperature is preferably within the range of 200°–700° C. and more preferably within the range of 300°–600° C., The titanium dioxide layer may not sufficiently be obtained when the temperature is lower than 200° C., while most of low-order titanium oxide may be converted into titanium dioxide and then the vivid tone of color can not be exhibited when the temperature exceeds 700° C.

The reduction time in the present invention is preferably 5 hours or more, and more preferably 5–20 hours. When the reduction time is shorter, sufficient reduction can not be performed.

The reduction atmosphere in the present invention is the atmosphere having a low oxygen content, which may be least one atmosphere condition selected from a reduced-pressure air atmosphere of 100 torr or less, an inactive gas atmosphere, and a reducing gas atmosphere, and preferably a reduced-pressure air atmosphere of 100 torr or less, and more preferably of 1 torr or less.

EXAMPLES

In the following, preferable examples of the present invention will be explained. The present invention is not limited to these examples. The compounding amounts will be shown by weight % unless otherwise indicated.

EXAMPLE 1

In the first place, an explanation will be given for an example where silicon and metal aluminum, which are typical reducing agents in the present invention, are used to manufacturing a color titanium mica pigment.

This color titanium mica pigment is a pigment in which at least a part of a titanium dioxide layer on the surface of titanium mica material has been reduced to low-order titanium oxide by silicon and metal aluminum. Accordingly, the low-order titanium oxide layer contains silicon oxide resulting from the oxidation of silicon and aluminum oxide resulting from the oxidation of metal aluminum as well as low-order titanium oxide generated upon the oxidation of silicon and metal aluminum. In other word, thus color titanium mica pigment is a pigment in which mica is coated with low-order titanium oxide layer containing titanium oxide, silicon oxide and aluminum oxide and said titanium oxide is composed of low-order titanium oxide or both low-order titanium oxide and titanium dioxide.

More specific samples of this example will be explained in the following. A iridescence titanium mica pigment used as a raw material is commercially available (manufactured by Merck Incorporated in Germany) and has an interference color of green. To make samples of color titanium mica pigments, 100 g of the titanium mica pigment was used for each sample. The coating ratio of titanium dioxide with respect to the whole titanium mica used here as a material is about 60% by weight.

To the titanium mica pigment having an interference color of green, a predetermined amount of a reducing agent was added, the resulting mixture was stirred by a mixer, and the stirred mixture was charged into a container. The container was placed in an electric furnace and heated and reduced in atmosphere having a low oxygen content at a predetermined reduction temperature for a predetermined reducing time. When the atmosphere was a reduced-pressure air atmosphere, it was evacuated by a vacuum pump to a pressure of not higher than 1 torr. The reduction time was that from the moment when the temperature of electric furnace returned the reduction temperature again after the container was placed in it.

A dispenser was used to disperse 1.0 g of thus obtained powder into 15 g of nitroclear (manufactured by Musashino Paint Company). A 0.1 mm applicator was used to apply the resulting mixture to a black hiding chart. Then the color was measured by the Colorimetry Measuring Apparatus-1000R (manufactured by Minolta Company). Also, the degree of sintering of thus obtained powder was viewed by human eyes and evaluated according to the following standards:

<Standards for evaluating degree of sintering>

−: No sintering is noticeable at all.

±: Sintering can hardly be noticed.

+: Slight sintering is noticeable.

++: Sintering is noticeable.

Comparative Sample 1

TABLE 1 and TABLE 2 show comparative sample in which only silicon was used as a reducing agent. The condition data of the reduction is the following;

<In TABLE 1>

Reduction temperature: 850° C.

Reduction time: 20hr

Reduction atmosphere: reduced-pressure air of 1 torr or less

Reducing agent: silicon only

<In TABLE 2>

Reduction temperature: 900° C.

Reduction time: 10 hr

Reduction atmosphere: reduced-pressure air of 1 torr or less

Reducing agent: silicon only

TABLE 1

| Si | Si/TiO$_2$ | SiO$_2$/TiO$_2$ | L | a | b | ΔE | Sintering |
|---|---|---|---|---|---|---|---|
| Material (titanium mica) | | | 51.37 | −12.16 | 4.59 | 0.0 | |
| 0.01 | 0.017 | 0.036 | 51.14 | 11.92 | 4.12 | 0.68 | |
| 0.05 | 0.08 | 0.18 | 49.33 | −12.69 | −2.03 | 3.32 | − |
| 0.1 | 0.17 | 0.36 | 48.36 | −13.11 | −1.23 | 4.61 | − |
| 0.5 | 0.83 | 1.79 | 43.15 | −13.26 | −3.10 | 11.31 | − |
| 1.0 | 1.67 | 3.57 | 42.04 | −13.09 | −3.69 | 12.51 | − |
| 3.0 | 5.00 | 10.71 | 35.06 | −11.57 | −4.41 | 18.63 | − |
| 5.0 | 8.33 | 17.86 | 28.69 | 9.05 | −6.23 | 25.32 | − |
| 7.0 | 11.67 | 25.00 | 20.11 | −2.60 | −9.56 | 35.62 | − |
| 10.0 | 16.67 | 35.71 | 14.04 | 4.13 | −9.50 | 43.09 | − |
| 12.0 | 20.00 | 42.86 | 14.37 | 3.95 | −7.74 | 42.19 | − |
| 15.0 | 25.00 | 53.57 | 14.95 | 3.54 | −6.52 | 41.18 | − |
| 20.0 | 33.34 | 71.42 | 14.91 | −3.61 | −4.93 | 40.85 | − |
| 25.0 | 41.67 | 107.13 | 15.03 | 8.45 | −4.51 | 40.58 | − |

TABLE 2

| Si | Si/TiO$_2$ | SiO$_2$/TiO$_2$ | L | a | b | ΔE | Sintering |
|---|---|---|---|---|---|---|---|
| Material (titanium mica) | | | 51.37 | 12.16 | 4.59 | 0.0 | |
| 3.0 | 5.00 | 10.71 | 17.41 | −0.39 | 17.66 | 42.27 | − |
| 10.0 | 16.67 | 35.71 | 13.58 | 3.60 | −4.54 | 41.95 | − |
| 12.0 | 20.00 | 42.86 | 13.65 | 3.19 | −3.91 | 41.60 | − |

Si (g): amount of silicon added to 100 g of titanium mica material.
Si/TiO$_2$ (wt %): ratio of added silicon with respect to 100 wt % of titanium dioxide in titanium mica material.
SiO$_2$/TiO$_2$ (wt %): ratio of silicon oxide with respect to 100 wt % of titanium dioxide in titanium mica material, which is reduced value from Si/TiO$_2$ above.
ΔE: degree of change of color tone with respect to titanium mica material.

As clearly shown in TABLE 1 and TABLE 2, a definite change is obtained in tone of color without sintering when titanium mica is heated and reduced together with about 0.05 wt % of silicon with respect to titanium dioxide in the titanium mica material.

The more the added amount of silicon is, the lager the change of the color tone is. When the amount of silicon with respect to titanium oxide is about more than 0.5 wt %, in particular more than 5.0 wt %, the change of color tone is large and a vivid tone of color is obtained, Also, the value of L is smaller as the amount of added silicon becomes more. It shows that the reduction progressn as the amount of added silicon becomes more.

However, the maximum change of color tone is obtained at about 17 wt % of silicon with respect to titanium dioxide and the more change of color tone can not be obtained when the amount of added silicon exceeds about 17 wt %. For example, when more than 20 wt % of silicon is added with respect to titanium dioxide, the change in tone of color becomes smaller as well as the value of L becomes higher. This is the result that the reduction does not progress for more and the silicon oxide generated in the obtained pigment increases. Further, when the amount of silicon is more than about 35 wt % with respect to titanium dioxide, the tone of color gets blurred as a whole even by human eyes.

Thus, in the case of using silicon only as a reducing agent, when the amount of added silicon with respect to titanium oxide is 0.05–35 wt %, in particular 0.5–20 wt %, a change of color tone is obtained but the reduction can hardly progress and the color tone of the obtained pigment get blurred as if the amount of silicon is increased in order to obtain more degree of reduction because there is a limit of reducing power of silicone only.

Comparative Sample 2

TABLE 3 shows comparative samples in which only metal aluminum is used as a reducing agent. The condition data of the reduction is the following.

<In TABLE 3>

Reduction temperature: 850° C.

Reduction time: 20 hr

Reduction atmosphere: reduced-pressure air of 1 torr or less

Reducing agent: metal aluminum only

TABLE 3

| Al | Al/TiO$_2$ | Al$_2$O$_3$/TiO$_2$ | L | a | b | ΔE | Sintering |
|---|---|---|---|---|---|---|---|
| Material (titanium mica) | | | 51.37 | −12.16 | 4.59 | 0.0 | |
| 0.05 | 0.08 | 0.16 | 46.05 | −13.12 | −2.18 | 8.66 | − |
| 0.1 | 0.17 | 0.31 | 44.58 | −12.86 | −3.32 | 10.44 | − |
| 0.5 | 0.83 | 1.57 | 36.33 | −13.03 | 6.52 | 18.72 | − |
| 1.0 | 1.67 | 3.15 | 29.99 | −11.34 | −7.09 | 24.38 | ± |
| 3.0 | 5.00 | 9.44 | 16.26 | −1.76 | −11.85 | 40.14 | ± |
| 5.0 | 8.33 | 15.74 | 10.87 | 3.61 | −6.32 | 44.81 | ± |
| 7.0 | 11.67 | 22.04 | 13.04 | 3.31 | −1.02 | 41.71 | ± |
| 10.0 | 16.67 | 31.48 | 15.64 | 2.83 | 0.99 | 38.91 | ++ |

Al(g): amount of metal aluminum added to 100 g of titanium mica material.
Al/TiO$_2$ (wt %): ratio of added metal aluminum with respect to 100 wt % of titanium dioxide in titanium mica material.
Al$_2$O$_3$/TiO$_2$ (wt %): ratio of aluminum with respect to 100 wt % of titanium dioxide in titanium mica material, which is reduced value from Al/TiO$_2$ above.
ΔE: degree of change of color tone with respect to titanium mica material.

As clearly shown in TABLE 3, when only aluminum is used as a reducing agent, larger change is obtained in tone of color as compared with the case of using silicon only. However, when the amount of added metal aluminum exceeds about 1.5 wt % with respect to titanium dioxide to obtain sufficient change of color tone and degree of reduction, the sintering occurs easily. In particular, when it is about 12 wt % or more, sintering becomes remarkable.

In this way, in a case of using only aluminum as a reducing agent, though large change in color tone can be obtained by using only small amount of aluminum, sintering occurs easily so that it is hard to obtain uniform quality of the pigment.

Sample 1

TABLE 4 and TABLE 5 show samples in which both silicon and metal aluminum are used as reducing agents. In TABLE 4, 3 g of silicon and predetermined amount of aluminum were added with respect to 100 g of titanium mica material. In TABLE 5, 7 g of silicon and predetermined amount of aluminum were added with respect to 100 g of titanium mica material.

The other condition data of the reduction is the following.

<In TABLE 4 and TABLE 5>

Reduction temperature: 900° C.

Reduction time: 10 hr

Reduction atmosphere: reduced-pressure air of 1 torr or less

TABLE 4

| Al | Al/TiO$_2$ | Al$_2$O$_3$/TiO$_2$ | L | a | b | Δ E | Sintering |
|---|---|---|---|---|---|---|---|
| 0.0 | 0.0 | 0.0 | 17.41 | −0.39 | −17.66 | 0.0 | − |
| 0.001 | 0.0017 | 0.0031 | 17.20 | −0.31 | −17.19 | 0.52 | |
| 0.01 | 0.017 | 0.031 | 13.67 | 2.99 | 16.67 | 5.04 | − |
| 0.3 | 0.50 | 0.94 | 13.81 | 3.92 | 18.46 | 5.67 | |
| 0.5 | 0.83 | 1.57 | 13.60 | 4.22 | −17.50 | 5.98 | − |
| 1.0 | 1.67 | 3.15 | 10.76 | 3.95 | −10.35 | 10.8 | − |
| 2.0 | 3.34 | 6.30 | 10.92 | 3.93 | −6.91 | 13.3 | |

TABLE 5

| Al | Al/TiO$_2$ | Al$_2$O$_3$/TiO$_2$ | L | a | b | ΔE | Sintering |
|---|---|---|---|---|---|---|---|
| 0.0 | 0.0 | 0.0 | 15.60 | 1.73 | −10.40 | 0.0 | − |
| 0.01 | 0.017 | 0.031 | 13.33 | 4.50 | −10.70 | 3.59 | − |
| 0.02 | 0.034 | 0.062 | 13.11 | 4.36 | −9.21 | 3.81 | − |
| 0.05 | 0.083 | 0.16 | 12.81 | 4.39 | −8.61 | 4.24 | − |
| 0.1 | 0.17 | 0.31 | 12.88 | 4.49 | −9.10 | 4.09 | − |
| 0.2 | 0.34 | 0.62 | 13.19 | 4.59 | −9.77 | 3.88 | − |
| 0.3 | 0.50 | 0.94 | 13.07 | 4.59 | −8.96 | 4.07 | − |
| 0.5 | 0.83 | 1.57 | 13.35 | 4.14 | −6.55 | 5.07 | − |
| 1.0 | 1.67 | 3.15 | 12.83 | 3.43 | −5.89 | 5.56 | − |
| 2.0 | 3.34 | 6.30 | 13.23 | 3.21 | −3.95 | 7.03 | − |
| 3.0 | 5.00 | 9.44 | 12.82 | 3.13 | −2.53 | 8.47 | − |

Al (g), Al/TiO$_2$ (wt %), and Al$_2$O$_3$/TiO$_2$ (wt %) are same to those in TABLE 3.
ΔE: degree of change of color tone with respect to the product obtained by using silicon without aluminum.

In TABLE 5, it is understood that when about 0.01 wt % or more of aluminum with respect to titanium dioxide together with silicon is used as a reducing agent, degree of reduction and change of color tone are lager than when only silicon is used. Namely, higher reducing power and larger change in color tone can be obtained by using such a small amount of aluminum with silicon as compared with using silicon only. Also, when the amount of aluminum used as a reducing agent is more than two thirds as weighty as the amount of silicon as a reducing agent, more rise in degree of reduction and more change of color tone can not be expected. Accordingly, 0.01 wt % or more of aluminum used as a reducing agent is necessary with respect to titanium dioxide in titanium mica material and the amount of aluminum is preferably two thirds or less, more preferably one third or less, as weighty as the amount of silicon in order to exhibit the cooperative effect by using aluminum and silicon.

As clearly shown in TABLE 3, aluminum causes sintering easily when it only is used as a reducing agent. Contrary to this, when aluminum is used with silicon, sintering occurs hardly. Namely, by using aluminum with silicon as a reducing agent, degree of reduction does not only be higher, but ocurrance of sintering can be supressed so that comparative large amount of aluminum can be used in reduction. As too much excess aluminum, however, may cause sintering, the maximum amount of aluminum as a reducing agent is preferably 17 wt % or less with respect to titanium dioxide in the range that degree of reduction is higher as well as sintering can not be caused.

As mentioned in the foregoing, preferably aluminum is used with silicon, and the amount of aluminum as the reducing agent is 0.01–17 wt % with respect to 100 wt % of titanium dioxide, more preferably 0.01–5 wt %. Further amount of aluminum with respect to silicon as a reducing agent is preferably two thirds or less, more preferably one third or less. Furthermore, the amount of siliocone used as a reducing agent is preferably 0.05–35 wt % with respect to 100 wt % of titanium dioxide, and more preferably 0.5–20 wt %. When aluminum and silicon as reducing agents are used in such range, higher reduction power and larger change of color tone can be obtained as compared with the case of using either aluminum or silicon, and sintering does not occur so that uniform quality of the obtained pigment can be obtained.

Also, thus pigment containing low-order titanium oxide, silicon oxide and aluminum oxide generated by oxidation of the reducing agents exists together with low-order titanium oxide which is generated from titanium dioxide in the material when the reducing agents is oxidized. As the reducing agents are added in the range mentioned above, the amount of silicon oxide with respect to titanium dioxide in the material is preferably 0.1–75 wt %, more preferably 1.0–45 wt %, and the amount of aluminum oxide with respect to titanium dioxide in the material is preferably 0.01–35 wt %, more preferably 0.01–10 wt %. Further, in the obtained pigment, the amount of aluminum in the aluminum oxide is preferably two thirds or less as weighty as the amount of silicon in the silicon oxide, more preferably one third or less.

The condition of reduction using silicon and aluminum as reducing agents was studied as the following.

Sample 2

The reduction time was varied in TABLE 6. 10 g of silicon only or 10 g of silicon with 1 g of aluminum was added with respect to 100 g of titanium mica material.

The other condition data of the reduction is the following.
<In TABLE 6>
Reduction temperature: 900° C.
Reduction atmosphere: N z (0.2 l/min)

TABLE 6

| Reduction time(hr) | Si | | | | Si/Al | | | |
|---|---|---|---|---|---|---|---|---|
| | L | a | b | ΔE | L | a | b | ΔE |
| 1 | 35.71 | 11.26 | 5.25 | 18.52 | 25.45 | −5.74 | −13.28 | 32.13 |
| 5 | 32.68 | −10.49 | 7.64 | 22.40 | 22.91 | −3.24 | −15.59 | 36.01 |
| 10 | 25.85 | 6.09 | −11.51 | 30.78 | 13.36 | 3.48 | 5.58 | 42.34 |

ΔE: degree of change of color tone with respect to titanium mica material.

As clearly shown in TABLE 6, on each reduction time, degree of reduction is higher and reduction progress for shorter time when aluminum with silicon is used. Namely, the same degree of reduction of the product obtained by reduction with only silicon for 10 hours can be obtained by reduction with silicon and aluminum for 1 hour, and higher degree of reduction can be obtained for 5 hour or more. Further, the same can be said when the reduction atmosphere is reduced-pressure air atmosphere.

Accordingly, the reduction time is preferably 1 hour or more, more preferably 5 hour or more.

Sample 3

The reduction atmosphere was varied in TABLE 7. The other condition data of the reduction is the following.
<In TABLE 6>
Reduction temperature: 900° C.
Reduction time: 5 hours
Reducing agent: 10 g of silicon with 1 g of aluminum was added with respect to 100 g of titanium mica material

TABLE 7

| Reduction time(hr) | Reduced pressure (≦1 torr) | | | | N₂(0.2 l/min) | | | |
|---|---|---|---|---|---|---|---|---|
| | L | a | b | ΔE | L | a | b | ΔE |
| 5 | 12.82 | 3.00 | 3.92 | 42.29 | 22.91 | −3.24 | −15.59 | 36.01 |

ΔE: degree of change of color tone with respect to titanium mica material.

In TABLE 7, it is understood that the reduction can progress effectively in atmosphere having a low oxygen content, more effectively in the reduced-pressure air atmosphere.

Comparative Sample 3

The reduction temperature was varied in TABLE 8 and TABLE 9. 10 g of silicon only or 10 g of silicon with 1 g of aluminum was added with respect to 100 g of titanium mica material.

The other condition data of the reduction is the following;
<TABLE 6>
Reduction temperature: 1000° C.
Reduction atmosphere: N₂(0.2 l/min)

TABLE 8

| Reduction time(hr) | Si | | | | Si + Al | | | |
|---|---|---|---|---|---|---|---|---|
| | L | a | b | ΔE | L | a | b | ΔE |
| 1 | 25.88 | 6.77 | −7.74 | 28.82 | 22.84 | −4.88 | −8.27 | 32.13 |
| 5 | 16.48 | 1.41 | −5.26 | 38.71 | 15.68 | 2.05 | 1.03 | 38.58 |
| 10 | 23.20 | −4.57 | −8.39 | 31.93 | 17.99 | 0.88 | −7.82 | 37.92 |

ΔE: degree of change of color tone with respect to titanium mica material.

TABLE 9

| Reduction | Degree of sintering | |
|---|---|---|
| time(hr) | Si | Si + Al |
| 1 | — | — |
| 5 | + | ± |
| 10 | l | + |

At the reduction temperature of 1000° C., reduction using only silicon for about 1 hour progress insufficiently so that change of color tone is small. When the reduction time is longer in order to obtain sufficient degree of reduction, sintering is occurred as shown on reduction time of 5 hours or more. Also, as the temperature is high such as 1000° C. and the time is longer such as 10 hours, the influence of a nitorogenated product is so large that change of color tone return to that of the product obtained by reduction of 1 hour. Further, the color tone of 10 hours reduction tends to be dull.

Accordingly, sufficient degree of reduction and color tone can not be obtained by using only silicon as a reducing agent at such high temperature.

On the other hand cooperated effect of aluminum and silicon exhibits at such high temperature and the same level or more degree of reduction without using aluminum can be obtained by using aluminum with silicon on each reduction time. Sintering, however, is easy to occur in a high temperature such as 1000° C., as shown in TABLE 9.

Contrary to this, when the reduction temperature is low such as 900° C. shown in Sample 1–3, sintering was not caused in spite of addition of aluminum.

Accordingly, the reduction temperature in this invention is preferably 500°–950° C., more preferably 700°–900° C.

When a metal other than titanium, silicon, and aluminum is used as a reducing agent together with silicon compound and aluminum compound in the present invention, the more excellent color tone can be obtained. Also, when a reducing assistant is used with a reducing agent in the present invention, the reduction is performed more thoroughly and vivid tone of color is more easily exhibited.

The following are examples in which such a metal and/or reducing a assistant are used with aluminum and silicon.

Sample 4

To 100 g of the titanium mica pigment having an interference color of green, 7.0 g of silicon and 0.05 g of metal aluminum as reducing agents and 3.0 g of aminoguanidine as a reducing assistant were added. The resulting mixture was stirred by a mixer and then charged into a container. The container was placed in an electric furnace, evacuated by a vacuum pump to a pressure of not higher than 1 torr, and then heated and reduced at a reduction temperature of 900° C. for a reducing time of 10 hours.

Sample 5

To 100 g of the titanium mica pigment having an interference color of green, 2.0 g of silicon, 0.5 g of metal aluminum, and 2.0 g of metal iron as reducing agents and 0.5 g of p-phenylenediamine as a reducing assistant were added. The resulting mixture was stirred by a mixer and then charged into a container. The container was placed in an electric furnace, evacuated by a vacuum pump to a pressure of not higher than 1 torr, and then reductively fired at a reduction temperature of 900° C. for a reducing time of 10 hours.

The measured colorimetric values of these samples are shown in TABLE 10.

TABLE 10

|  | L | a | b |
|---|---|---|---|
| Sample 4 | 12.82 | 3.50 | −6.48 |
| Sample 5 | 14.4 | 4.00 | −7.75 |

Thus, the color titanium mica pigment containing low-order titanium oxide in the prevent invention had a vivid appearance color same to the interference color of the used titanium mica material and there is no sintering in it.

Example 2

In the following, an explanation will be given for an example where typical reducing agents in the present invention is used to reduce a titanium dioxide in titanium mica suffice into low-order titanium oxide and then thus formed low-order titanium surface is reoxidized into titanium dioxide to form a color titanium mica pigment.

In this color titanium mica pigment, there is a layer made of low-order titanium oxide or low-order titanium oxide and titanium dioxide on the mica surface. On the surface of this layer, a layer of titanium dioxide is formed. Depending on the reducing condition, the formed pigment may have a structure made of mica, titanium dioxide layer, low-order titanium oxide layer, and titanium dioxide layer mounted in this order.

While the color titanium mica pigment discussed in EXAMPLE 1 is much more stable than the conventional pigments, its color may shift when the low-order titanium oxide surface layer is unintentionally reoxidized upon a high temperature.

Accordingly, in the present example, the titanium mica pigment formed as in the cases with EXAMPLE 1 is further heated and oxidized in an oxidizing atmosphere at 200°–700° C., more preferably at 300°–600° C., to convert the low-order titanium oxide layer surface into a titanium dioxide layer, thereby further improving the oxidation resistance.

More specific samples of this example will be explained in the following. As in the case with EXAMPLE 1, five kinds of commercially-available iridescence titanium mica pigments having interference colors (manufactured by Merck Incorporated in Germany) were used as a raw material. To make samples of color titanium mica pigments with different kinds of amount of reducing agents, reduction temperatures, and reducing times, 100 g of such a titanium mica pigments was used for each sample.

Sample 6

To 100 g of the titanium mica pigment having an interference color of green, 5 g of silicon and 0.5 g of metal aluminum were added as reducing agents. The resulting mixture was stirred by a mixer and then charged into a container. This container was placed in an electric furnace, evacuated to a pressure of 1 torr or less, and then heated and reduced at a reduction temperature of 900° C. for a reducing time of 12 hours. Thus obtained reduced material was then heated and oxidized oxidatively fired in the air at 400° C. for 1.0 hour.

Sample 7

The reduced material of Sample 6 was heated and oxidized in the air at 500° C. for one hour.

The measured colorimetric values of these samples are shown in TABLE 11.

TABLE 11

|  | L | a | b |
|---|---|---|---|
| Reduced material obtained Sample 6 | 20.29 | −3.54 | −7.35 |
| Sample 6 | 27.71 | −10.06 | −6.87 |
| Sample 7 | 36.22 | 13.31 | −4.28 |

As clearly shown in TABLE 11, the color titanium mica pigment in accordance with this example exhibited a vivid tone of color.

Also, the color titanium mica pigment in accordance with this example exhibited a very small change in tone of color before and after a heat-resistance test, thereby indicating its excellent heat resistance.

As explained in the foregoing, pigments containing low-order titanium oxide can efficiently be manufactured, while preventing sintering from generating due to the fusion between the reducing agents or the reducing agents and powders, in the method of manufacturing the pigment containing low-order titanium oxide in accordance with the present invention in which both metal aluminum and silicon are used as reducing agents for titanium dioxide and the heating and reducing is effected in an atmosphere having a low oxygen content.

What is claimed is:

1. A $TiO_x$ coated mica pigment comprising $TiO_x$, where $X<2$, silicon oxide and aluminum oxide in one composite layer wherein said silicon oxide and said aluminum oxide are end products of silicon and an aluminum compound used as reducing agents to convert $TiO_2$ to $TiO_x$, wherein said silicon and said aluminum compound are not oxide forms of silicon and aluminum.

2. A pigment according to claim 1, wherein silicon oxide is 0.1–75 wt % with respect to an amount of titanium dioxide, aluminum oxide is 0.01–35 wt % with respect to the amount of titanium dioxide and aluminum in the aluminum oxide weighs two thirds or less as much as silicon in the silicon oxide.

3. A pigment according to claim 2, wherein the amount of silicon oxide is 1.0–45 wt %.

4. A pigment according to claim 2, wherein the amount of aluminum oxide is 0.01–10 wt %.

5. A pigment according to claim 2, wherein the pigment containing $TiO_x$ where $X<2$ is a color titanium mica pigment, in which mica is coated with a $TiO_x$ where $X<2$ layer containing titanium oxide, silicon oxide and aluminum oxide, and said titanium oxide is composed of $TiO_x$ where $X<2$ or both $TiO_x$ where $X<2$ and titanium dioxide.

6. A pigment according to claim 2, wherein the pigment containing $TiO_x$ where $X<2$ is a color titanium mica pigment, in which mica is coated with a $TiO_x$ where $X<2$ layer containing titanium oxide, silicon oxide, and aluminum oxide and said titanium oxide is composed of $TiO_x$ where $X<2$ or both $TiO_x$ where $X<2$ and titanium dioxide and further said $Tio_x$ where $X<2$ layer is coated with titanium dioxide.

7. A pigment according to claim 2, wherein an oxide of a metal other than titanium, silicon and aluminum is mixed with $TiO_x$ where $X<2$, silicon oxide, and aluminum oxide.

8. A pigment according to claim 7, wherein the metal other than titanium, silicon and aluminum is one or more selected from the group consisting of manganese, iron, cobalt, nickel, and zinc.

9. A method of manufacturing a $TiO_x$ coated mica pigment comprising the steps of:

mixing both silicon and an aluminum compound with $TiO_2$ coated mica wherein said silicon and said aluminum compound are not oxide forms of silicon and aluminum;

producing said pigment by converting $TiO_2$ to $TiO_x$, where $X<2$, and said silicon and said aluminum compound to silicon oxide and aluminum oxide by heating in an atmosphere having a low oxygen content, said silicon oxide and aluminum oxide being co-existed with said $TiO_x$ in one composite layer.

10. A method according to claim 9, wherein the silicon used as a reducing agent is 0.05–35 wt % with respect to titanium dioxide, aluminum in the aluminum compound used as the reducing agent is 0.01–17 wt % with respect to titanium dioxide, and the aluminum in the aluminum compound weighs two thirds or less as much as silicon.

11. A method according to claim 10, wherein the amount of silicon in the silicon compound is 0.5–20 wt %.

12. A method according to claim 10, wherein the amount of aluminum in the aluminum compound is 0.01–5 wt %.

13. A method according to claim 10, wherein the heating temperature is 500°–950° C.

14. A method according to claim 10, wherein a reduction time is 5 hours or more.

15. A method according to claim 10, wherein a color titanium mica pigment, in which mica is coated with a layer containing titanium oxide, silicon oxide, and aluminum oxide and wherein said titanium oxide is composed of $TiO_x$ where $X<2$ or both $TiO_x$ where $X<2$ and titanium dioxide, is obtained.

16. A method according to claim 15, wherein said method comprises the steps of: mixing mica coated with titanium dioxide together with both silicon and aluminum as reducing agents; and heating and reducing the mixture of the mica coated with titanium dioxide and the reducing agents in an atmosphere having a low oxygen content at a reduction temperature of 500°–950° C. for 5 hours or more.

17. A method according to claim 10, wherein a color titanium mica pigment, in which mica is coated with a $TiO_x$ where $X<2$ layer containing titanium oxide, silicon oxide, and aluminum oxide and said titanium oxide is composed of $Tio_x$ where $X<2$ or both $TiO_x$ where $X<2$ and titanium dioxide while said $TiO_x$ where $X<2$ layer is further coated with titanium dioxide, is obtained as the pigment containing $TiO_x$ where $X<2$.

18. A method according to claim 17, wherein said method comprises the next steps of: mixing mica coated with titanium dioxide together with silicon and aluminum as a reducing agent; heating and reducing the mixture of the mica coated with titanium dioxide and the reducing agents is heated in an atmosphere having a low oxygen content at a reduction temperature of 500°–950° C. for 5 hours or more; and then heating and oxidizing the reduced product in an oxidative atmosphere at a oxidation temperature of 300°–700° C.

19. A method according to claim 10, wherein a metal other than titanium, silicon, and aluminum is used as a reducing agent together with silicon and aluminum.

20. A method according to claim 19, wherein the metal other than titanium, silicon, and aluminum is at least one member selected from the group consisting of manganese, iron, cobalt, nickel, and zinc.

21. A method according to claim 10, wherein a reducing assistant is used together with the reducing agents.

22. A method according to claim 21, wherein the reducing assistant is an inorganic ammonium compound.

23. A method according to claim 22, wherein the inorganic ammonium compound is at least one member selected from the group consisting of urea, ammonium chloride, ammonium hydrogencarbonate, and ammonium carbonate.

24. A method according to claim 21, wherein the reducing assistant is an organic NH-containing compound.

25. A method according to claim 24, wherein the organic NH-containing compound is at least one member selected from the group consisting of amide, amine, imide and imine.

26. A method according to claim 9, wherein the atmosphere having a low oxygen content is a reduced-pressure air atmosphere of 100 torr or less.

27. A method according to claim 26, wherein the atmosphere having a low oxygen content is a reduced-pressure air atmosphere of 1 torr or less.

* * * * *